United States Patent [19]
Sundermann

[11] 3,835,727
[45] Sept. 17, 1974

[54] STEPPED TOGGLE MECHANISM
[76] Inventor: Henry L. Sundermann, Rt. 4 Box 79, Sioux Falls, S. Dak. 57101
[22] Filed: June 26, 1973
[21] Appl. No.: 373,886

Related U.S. Application Data
[62] Division of Ser. No. 211,907, Dec. 27, 1971, Pat. No. 3,780,833.

[52] U.S. Cl................ 74/520, 74/106, 188/265
[51] Int. Cl.............................. G05g 1/04
[58] Field of Search........... 74/520, 106; 188/265

[56] References Cited
UNITED STATES PATENTS
2,617,312  11/1952  Prentice.................. 74/520
3,625,088  12/1971  Sundermann............... 74/520

Primary Examiner—Samuel Scott
Assistant Examiner—F. D. Shoemaker

[57] ABSTRACT

A stepped toggle mechanism having two principal links for expanding movement and a stepped release mechanism adapted to allow subsequent similar movements of an operating arm to first expand the toggle to a set position and then to release it.

4 Claims, 4 Drawing Figures

PATENTED SEP 17 1974  3,835,727

STEPPED TOGGLE MECHANISM

This is a divisional application of my former application, Ser. No. 211,907, filed Dec. 27, 1971, now U.S. Pat. No. 3,780,833, and is principally directed to a novel toggle release mechanism adapted for use on a brake system of the type described in that application.

BACKGROUND AND SUMMARY OF THE INVENTION

Although toggle mechanisms having stepped action are not new, the mechanism described herein has a unique form and a unique use. The mechanism is particularly designed for release by successive pulls on an operating arm which, in fact, carries the release mechanism. The operating arm and its connecting link form the toggle adapted to press the links outwardly, as against the inner surface of a pair of wheels. Successive pulls first set the toggle in a latched position and then break the latched position to release the toggle.

FIGURES

Figure 1:
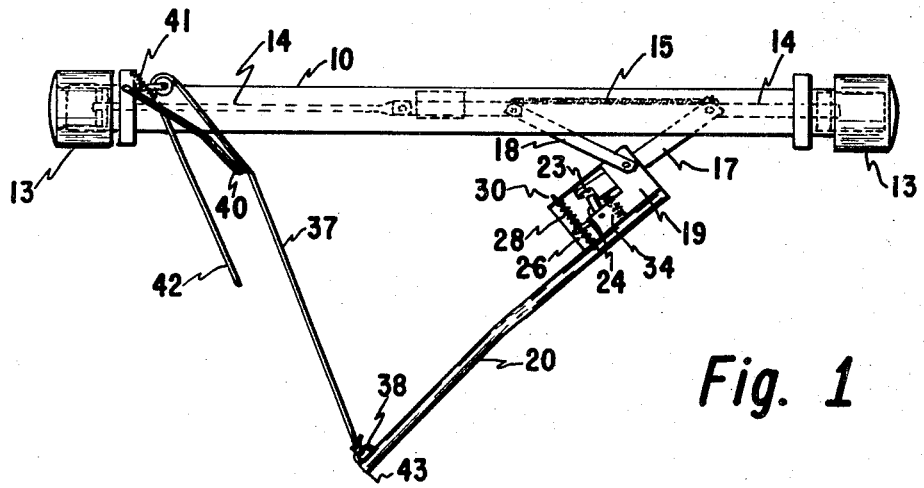
Figure 2:
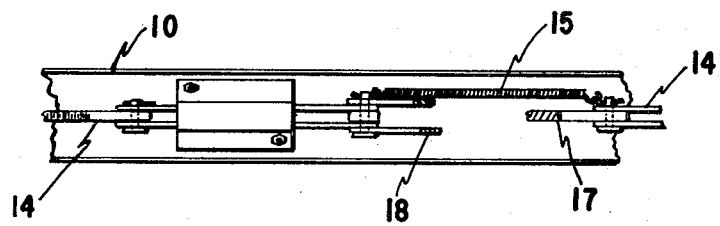
Figure 3:
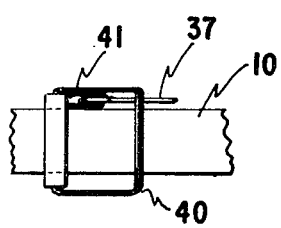
Figure 4:
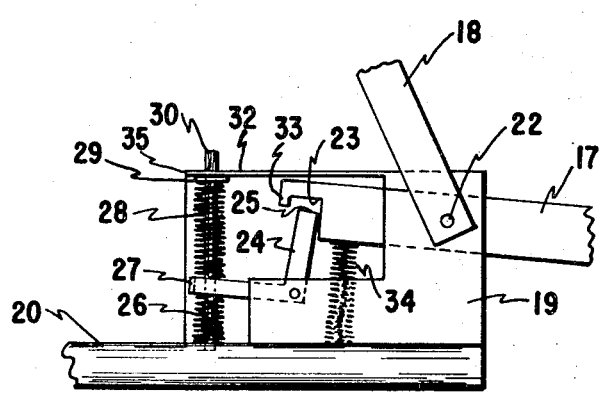

FIG. 1 is a top plan view of a brake bar embodying my toggle mechanism and removed from the wagon, FIG. 2 is a detailed front elevational view to an enlarged scale showing the operating mechanism for moving the brake shoes, FIG. 3 is an enlarged detail elevational view of the holding bracket in place on the brake member, FIG. 4 is a greatly enlarged detail view of the toggle release device separated from the device.

DESCRIPTION

Briefly my invention comprises a toggle mechanism particularly adapted to operate an expanding brake mechanism such as one for a farm wagon as described in my original application previously referred to. However, it may have other uses where an expanding linear movement is required.

More specifically and referring to the drawings which illustrate a wagon brake mechanism, the principal operating mechanism of my device includes a housing 10 which is fixed to the frame of a wagon in a position to be generally aligned with the tires on the rear wheels of the wagon. The brake shoes 13 may take the form of caps for the housing 10 and are slidably mounted relative to the housing. The shoes are connected to rods 14 slidably journalled in the housing and should be adjustable within reasonable limits to provide for slight differences in tire size or spacing. A tension spring 15 between the rods 14 is used to urge the brake shoes to a normally withdrawn or released position as shown in FIG. 1.

The operating mechanism to engage the brakes is generally an over-the-center toggle mechanism. This includes a toggle lever 17 and a connecting link 18 each pivotally connected to one of the rods 14 and also pivoted together at a bracket 19 on an operating lever 20.

The stepped toggle device is generally supported by the bracket 19, as best shown in FIG. 4. The pivotal connection between the lever 17 and link 18 is on an axis defined by a rivet, bolt or pin 22 extending through the bracket. The lever 17 extends past that axis and is shaped to form a notched end 23.

In order to provide for motion in a rigid condition to the engaged position where the shoes 13 are extended into engagement with the tires 12, it is necessary to block the pivotal motion between the lever 17 and the lever 20 with its associated bracket 19. This is accomplished by use of a bell crank shaped engagement lever 24 pivotally mounted in the bracket. One end 25 of this lever is adapted to engage the notched end 23 of the toggle lever 17 as shown. The engagement lever 24 is normally held in this position by the urging of a compression spring 26 engaged between the operating arm 20 and the opposite end 27 of the lever 24.

This normal holding may be overridden, however, by the action of a second compression spring 28. This spring is engaged between the end 27 of the lever 24 and a collar 29 on a pin 30. The pin 30 is slidably mounted in an extension wall 32 of the bracket 19 and may extend into a socket in the arm 20.

The springs 28 and 26 are so proportioned that when the pin 30 is free as shown in FIG. 4, the spring 26 is stronger and holds this lever 24 in the position shown. However, when the pin 30 is pressed toward the wall 32, the compression force of spring 28 becomes greater than that of spring 26 and the tendency is for the lever 24 to move to an alternate or open position. The notched end 23 will prohibit this motion so long as the end 25 of the lever 24 will be caught by the lip 33. However, upon motion of the end 25 away from the notched end 24, the engagement between the two will then be broken and the bracket 19 will then be free to pivot on the toggle lever 17.

A compression spring 34 tends to hold the toggle lever 17 and the bracket 19 in a pivotal position where the end 23 engages the wall 32. This urging is not strong, however, and when an operating force is applied to the arm 20, the spring 34 is readily compressed so that the end 25 of the operating lever 24 readily moves into engagement with the end 23 of the toggle lever 17.

A review of the operation of this mechanism may be helpful in the understanding of this device. In the normal relaxed position, shown in FIG. 4, the spring 34 tends to hold the lever 17 in a slightly tilted position relative to the arm 20. At this stage, the operating lever 24 is under control of the spring 26 so that it is held in position for the end 25 to engage the notched end 23 of lever 17 although that engagement does not then take place. As force is applied to the arm 20, the urging of the spring 34 is soon overcome and the engagement between the end 25 of operating lever 24 and the notched end 23 of lever 17 takes place creating a solid engagement which, on further motion of arm 20 causes the toggle action between the lever 17 and link 18. This motion forces the outward movement of the bars 14 in the housing 10 and consequent engagement between the shoes 13 and the tires 12.

Further movement of the arm 20 eventually results in the bracket 19 being moved into the housing 10 until the pivotal axis 22 is carried beyond the line between the bars 14. At this point, the toggle has gone "over-the-center" and no longer requires force to move further in that same direction.

Motion is eventually stopped by engagement of the pin 30 with the rear wall of the housing 10. As this pin is pressed inwardly by this engagement, the spring 28 is compressed until its force exceeds that of spring 26. So long as force is applied to the arm 20, the spring action causes no change in position of the lever 24. However, as the toggle goes over the center, force is no longer required on the arm 20 and shortly will be released by the operator.

As the force is released, the bracket 19 is tilted relative to the lever 17 again through action of the spring 34. This movement releases the end 25 of lever 24 from the lip 33, and since the spring 28 now exerts the greater force (because the pin 30 is now depressed) the engagement between the levers 24 and 17 is broken. Therefore, a successive exertion of force on the arm 20 will not be transmitted to the lever 17. Instead, pivotal motion can take place. As a result, the edge 35 of the wall 32 engages the wall of the housing 10 and acts as a fulcrum. Motion of the arm 20 causes pivoting about this fulcrum and moves the pivotal axis 22 again to its original side of the center line between the rods 14. The spring 15 then retracts the rod 14 and returns the mechanism to its original position. Release of the force on the arm 20 then allows the spring 34 to reset the position between the arm 20 and lever 17. By this time, the pin 30 has again extended allowing the spring 26 to take over and the lever 24 is also returned to position so that the cycle can again take place.

Control of the brake mechanism is through the arm 20. This may be moved by means of a rope 37 attached to the arm 20 at a loop 38 on one end. In order to prevent vibration from releasing the mechanism when in its over-the-center position, I have found it desirable to provide a latch means for holding the arm. This latch means takes the form of a loop 40 pivotally mounted on the housing 10 on a line near the place where the end of the arm lies when in that position. The loop is lightly urged to a position lying adjacent the housing by a spring 41.

The rope 37 is guided past the loop 40 as shown in FIG. 1 so that tension on the pulling end 42 will pull the arm 20 toward the housing 10. This tension tends to straighten the rope and thus to move the loop 40 against the pulling of the spring and away from the housing. The spring 41 is of such strength and the location and shape of the loop 40 is such, that a normal pulling tension in the rope 37 will move the loop 40 beyond the end of the arm 20 as it approaches the housing. As the mechanism goes over the center and tension on the rope is relaxed, the loop 40 is pulled toward the housing by the spring 41 and covers the end of the lever 20. A small lip 43 may be formed on the lever to ensure the engagement.

When the end 42 is again pulled, the rope 37 again tends to straighten. Movement of the arm 20 disengages the lip 43 from the loop 40, and then, as the arm 20 moves away from the housing, there is still sufficient tension in the rope 37 to hold the loop 40 out of engagement with the arm 20 and the entire mechanism moves to the fully released position.

This form of control is especially designed for control directly by hand or by controlled operating lever from the seat of the tractor; and may be most appropriate as a parking brake. It may also be useful as a breakaway brake by fastening the rope to the tractor so that if the wagon breaks away, the rope will be pulled to set the brake. It will be obvious that this mechanism may be adapted to other uses, although it is described in connection with a farm wagon brake system. Such description is not intended to limit the scope of my invention.

I claim:

1. For use with an expanding toggle mechanism including two toggle arms, a stepped toggle release mechanism comprising an operating lever, bracket means on said operating lever, said toggle arms being pivotally connected to said bracket on a common pivotal axis, releasable means in said bracket releasably engaging one of said toggle arms to hold it in fixed relationship with said operating lever, and spring loaded release means engaging said releasable means whereby actuation of said release means releases said releasable means to allow pivotal motion between said one arm and said operating lever.

2. The device of claim 1 in which said releasable means includes a bell crank device having one leg engageable with said one toggle arm and a second leg engaged by said spring loaded release means.

3. The device of claim 2 in which said release means includes a pair of springs, in engagement with said other leg and compression means adapted to compress one spring to a point where it overcomes the force of the other spring causing said bell crank device to release.

4. The device of claim 3 in which said compression means is positioned to engage said first toggle arm whereby motion of said operating lever toward said toggle arm beyond the point of engagement of said compression means with said first toggle arm tends to cause release of said release member.

* * * * *